United States Patent Office 3,658,710
Patented Apr. 25, 1972

3,658,710
METHOD OF REMOVING TUBERCLES USING ORGANIC POLYMERS AND SILICA AND/OR CHROMIUM COMPOUNDS
Paul R. Puckorius, Fairview Park, and William E. Zimmie, Lakewood, Ohio, assignors to W. E. Zimmie, Inc.
No Drawing. Filed Jan. 13, 1971, Ser. No. 106,285
Int. Cl. C02b 5/02, 5/06
U.S. Cl. 252—87
45 Claims

ABSTRACT OF THE DISCLOSURE

A method of removing tubercles of corrosion from a substrate and inhibiting further corrosion and scale formation on the substrate including the steps of providing an aqueous solution of two organic polymers and a water soluble silica containing compound and/or a water soluble chromium containing compound and applying it to the substrate. One of the polymers (1) is prepared from compounds characterized by the formula:

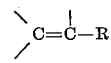

wherein R is selected from the group consisting of nitrile, imine, amide and carboxyl radicals, (2) has an average molecular weight ranging from about 15,000 to 15,000,000 and (3) has a weight concentration of about 0.01 to 300 parts per million parts of water. The other polymer is selected from the group consisting of polyacrylic acid, polyacrylate, organic phosphonates and mixtures thereof having an average molecular weight approximately in the range 1,000–50,000.

BACKGROUND OF THE INVENTION

The problems due to corrosion are so numerous that the costs involved are extremely difficult to measure. In addition to the deterioration and loss of the equipment itself due to corrosion, the costs involved in connection with down time for maintenance and repair, and contamination of the related system with corrosion products are also significant considerations. In many applications the equipment is constructed from corrosion resistant materials, such as copper or stainless steel, but the economic considerations limit this technique of eliminating corrosion problems.

The ferrous materials are generally preferred for the construction of the vast majority of water handling equipment in view of its physical properties and initial cost. However, the ferrous materials tend to corrode readily, particularly at elevated temperatures and when in contact with water. Corrosion is particularly troublesome in such equipment as cooling towers, either once through systems or recirculating systems, heat exchangers and other equivalent equipment used in connection with large volumes of water. The actual rate of corrosion, whether by chemical attack or galvanic action, is determined by the composition of the metal, the pH of the water passing through the system, the amount of dissolved oxygen in the water and the velocity of the water, as well as numerous other environmental factors.

The known practices of preventing or inhibiting corrosion includes the use of an imposed EMF, the use of a less noble sacrificial metal, water pretreatment to reduce the dissolved oxygen and the use of various compounds as corrosion inhibitors. However, the known corrosion inhibitors have not been entirely successful for one or more of the following reasons: (a) excessive costs when used in effective concentrations, (b) incompatibility with other additives, such as scale reducing materials, (c) a loss of effectiveness and a tendency to become aggressive below certain concentrations and (d) a tendency to promote foaming and fouling.

A common way to inhibit both corrosion and scale formation is to add acid and a corrosion inhibitor to the water. For the most part, scale results from super-saturation of the water with carbonates which precipitates as $CaCO_3$, $MgCO_3$, etc.; chlorides and sulfates are occasionally "hardness" factors to consider in scaling. Adding acid keeps the pH low (below 7) and keeps the scale forming materials in solution. However, it also makes the water more corrosive and thus a corrosion inhibitor must be added simultaneously.

The instant invention approaches the scale-corrosion problem differently. Heretofore the emphasis has been on treating the water or providing special alloys and it was conceived that another approach might be more successful. Painting large ferrous surfaces has sometimes been successful as has the application of thixotropic gels to metallic surfaces in acid atmospheres.

The thixotropic gel concept is best as it tends to fill in voids in the covering coat automatically. However, the known gels per se cannot be used where there is any substantial contacting fluid flow because the fluid will strip the gel from the substrate. Seemingly, the use of a thixotropic coating would be of relatively short lived usefulness. However, it was thought that if a substance could be found which would react somewhat in the nature of a thixotropic gel while at the same time forming an extremely thin coating on the substrate it would be an effective corrosion and scale inhibitor. An extremely thin coating would have less tendency to be separated from the substrate as a result of fluid turbulence.

Such a coating would not only inhibit corrosion but also inhibit scale formation because the coating would shield potential points of corrosion attack and "neucleation" for scale thereby making the starting point for scale or corrosion harder for the destructive elements to reach.

BRIEF DESCRIPTION OF THE INVENTION

It was discovered quite unexpectedly that the use of a very small amount of water soluble polyelectrolytic organic polymer performs this function. Many of the useful polymers are currently used to flocculate particles of mud and sediment built-up or entrained in water passing through boilers or other water systems. But it was never conceived that they could be used to coat the metallic surfaces to prevent corrosion.

As an experiment, certain other known corrosion control chemicals were tested in combination with the polymer coating. Surprisingly the blends of polymer and certain water soluble silica containing compounds and/or chromium containing compounds produced a remarkably synergistic effect. With proper, empirically deduced blends of polymer, silica and/or chromium it is possible to minimize corrosion in waters which are normally highly destructive to metallic substrates, while at the same time using much less of each component than prior experience would indicate.

Addition of a second polymer for inhibiting scale formation is useful in most cases. To be effective the scale inhibitor must be compatible with the other constituents of the corrosion inhibiting additive. Examples of such compatible additives are polyacrylic acid, polyacrylates, organic phosphonates and mixtures thereof having a relatively low molecular weight ranging from about 1,000–50,000.

It has now been discovered that very small amounts of certain polyelectrolytic organic polymers, known in the prior art to be effective as flocculating agents, are extremely effective in inhibiting corrosion of ferrous, aluminum, copper and other alloys in contact with water. More particularly it has been found that less than two percent by weight of these polymers, based on the weight of the water, are effective in preventing this corrosion. The reasons for this are three, the polymer (1) flocculates mud and sediment (2) removes previously formed tubercular corrosion and (3) coats the surfaces and prevents substantial contact of the metal by oxygen entrained in the water. Why the soluble polymer adheres to the substrate rather than remaining in solution is unknown but tests have verified that a thin film of the polymer does form on the substrate. The previously known corrosion inhibitors, silicates and chromates, are thought to react or coact with the polymer in some way to "buffer" the chromate or silicate ions where in some cases the indicated concentrations may super saturate the aqueous solution.

PREFERRED EMBODIMENTS

Polyelectrolytes which have been found effective in forming a coating on a substrate and thereby preventing or inhibiting the corrosion of numerous alloys include the polymers prepared from compounds having the formula:

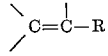

wherein R is selected from the group consisting of nitrile, amide, imide and carboxyl radicals, COOM where M is a lower alkyl radical preferably of 1 to 4 carbon atoms, and the water soluble salts thereof. Elements such as halogens, particularly chlorine, or alkyl or aryl groups as well as hydrogen may be present on the backbone hydrocarbon chain of the polymer.

Particularly suitable polyelectrolytic polymers for use in the present invention are the polymers of acrylic or methacrylic acid derivatives, for example, acrylic acid, the alkali metal and ammonium salts of methacrylic acid, acrylamide, methacrylamide, the N-alkyl acrylates, the aminoalkyl methacrylamides and the N-alkyl substituted aminoalkyl esters of either acrylic or methacrylic acids. These polymeric compositions may be homopolymers or they may be copolymers with other copolymerizing monomers, such as ethylene, propylene, isobutylene, styrene, a-methyl-styrene, vinyl acetate, vinyl formate, alkyl ether, acrylonitrile, methacrylonitrile, vinyl chloride, vinylidene chloride, the alkyl acrylates, the alkyl methacrylates, the alkyl maleates, and the alkyl fumarites, and other olefinic monomers copolymerizable therewith. The copolymers of this type, having at least 50 mole percent of the acrylic or methacrylic acid derivatives, are preferred, and especially when the comonomer is hydrophobic or has no ionizable group. Polymers of this type may be prepared directly by the polymerization of suitable monomers, or by the after chemical reaction of other polymers, for example, by the hydrolysis of acrylonitrile or methacrylonitrile polymers.

In connection with the various types of polyelectrolytic polymers suitable for the practice of this invention, the hydrophilic polymer may be prepared directly by the polymerization or copolymerization of one or more of the various available organic monomers with aliphatic unsaturation, if the said compounds contain a hydrophilic group, for example, carboxyl groups. Generally, more types of polyelectrolyte polymers can be prepared by subsequent reactions of polymers and copolymers. For example, polymers containing nitrile groups may be hydrolyzed to form water-soluble amide and carboxy containing polymers or hydrogenated to form amine containing polymers. Similarly, copolymers of maleic anhydride and vinyl acetate may be hydrolyzed to form polymers containing hydrophilic lactone rings. Other hydrophilic polymers may be prepared by the hydrolysis of copolymers of vinyl acetate wherein the acetyl groups are removed leaving hydroxy groups which promote the solubilization effect of polyelectrolytic groups present. By other reactions non-hydrophilic polymers may be converted into lactam or amide containing polymers which are more hydrophilic. Polyvinyl alcohol, not in itself a polyelectrolyte, may be converted into polyelectrolytes by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example, the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers may be prepared by the acid catalyzed polymerization of ethylenimine or the ammonolysis of ketone containing polymers, for example, polyvinyl methyl ketone. Similarly active halogen atoms may be reacted with bisulfite to substitute sulfonic acid group for the reactive halogens.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups, or derivatives thereof, heterocyclic nitrogen groups, aminoalkyl groups, alkoxy radicals and other organic groups, the number of which groups and the relative proportions of hydrophilic and hydrophobic groups being such as to provide a water-soluble polymeric compound having a substantially large number of ionizable radicals. The length of said continuous carbon chain must be such as to provide compounds having a weight average molecular weight of at least 10,000.

Among the various polymers as described above and water-soluble salts thereof useful in the practice of the present invention, there may be mentioned hydrolyzed polyacrylonitrile and polyacrylamide, sulfonated polystyrene, acrylamide-acrylic acid copolymers, polyacrylic acid, ½ calcium salt of hydrolyzed 1:1 copolymer of vinyl acetate-maleic anhydride, hydrolyzed styrenemaleic anhydride copolymer, ammonium polyacrylate, sodium polyacrylate, ammonium polymethacrylate, sodium polymethacrylate, diethanolammonium polyacrylate, guanidinium polyacrylate, dimethylaminoethyl polymethacrylate, acrylamide-acrylonitrile copolymers, methacrylic acid-dimethylaminoethyl methacrylate copolymer, sodium polyacrylate-vinyl alcohol copolymer, hydrolyzed methacrylic acid-acrylonitrile copolymer, vinyl acetate-maleic anhydride copolymer, vinyl formatemaleic anhydride copolymer, vinyl methyl ether-maleic anhydride copolymer, isobutylene-maleic anhydride copolymer, styrenemaleic anhydride copolymer, ethyl acrylate-maleic anhydride copolymer, vinyl chloridemaleic anhydride copolymer, hydrolyzed acrylonitrile vinyl acetate copolymer, hydrolyzed acrylonitrile-methacrylonitrile copolymer, hydrolyzed acrylonitrile-methacrylonitrile-vinyl acetate terpolymer, hydrolyzed acrylonitrile-methacrylic acid copolymer, vinyl pyridine-acrylonitrile copolymer, etc. Polymers containing cation active groups are also useful. Suitable compounds are, for example, ethylenimine, ethyl acrylate and acrylamidopropylbenzyldimethylammonium chloride, copolymers of methylolacrylamide and acrylamidopropylbenzyldimethylammonium chloride, copolymers of butadiene and 2-vinyl pyridine, and certain quaternary compounds such as polydimethylaminostyrene quaternized with benzyl chloride, alkyl chloride, etc. and quaernized copolymers of vinyl alcohol and morpholinylethylvinylether and the like.

The molecular weight of these polymers is fairly ambiguous. Molecular weights as low as 15,000 are useful as are molecular weights which range over 5 to 15 million. As long as the polymers are sufficiently low in molecular weight so as to be water soluble they have the characteristics required. Polymers of molecular weights of well over 2 million have such solubility. The difficulty of measuring molecular weights in the range of 2 to 15 million causes the numerical values to be somewhat ambiguous. Viscosity measurements particularly intrinsic viscosity determinations are particularly effective in attempting to determine the molecular weights in this range.

The polyacrylamides are particularly useful in the present invention. Polyacrylamide having a molecular weight of approximately 2 to 5 million gives good results and is preferred.

Polyelectrolytes have centers of electronic activity along the chain. Polyacrylamides for instance usually have at least a few polyacrylic acid links along the chain and whereas for a molecular weight of a million or two, the percentage of such acid links is very small, still there are enough acid links or other centers of electronic activity to support the theory that a thin film of approximately monomolecular thickness is formed on the surface of the equipment. Experimental analysis has verified that polymer coatings are formed on iron, copper and aluminum alloy surfaces and that the coatings are of approximately monomolecular thickness. Such a film or coating appears to serve somewhat in the nature of a dielectric to inhibit galvanic action. Without being limited to the above or the following theories as to the operations involved in the present invention, the results which occur are consistent with these theories.

The polymers may be absorbed on the surface to be protected by at least two distinctive types of bonding. Either or a combination of the two may be operative at a given time. The principal mode of attachment of polyacrylamide type polymer is by hydrogen bonding. This is a common type of bonding exhibited by organic acids, amides, alcohols, amines and others which contain a hydrogen atom attached to a strongly electro-negative atom. In these compounds the hydrogen atom has lost much of its electronic atmosphere, and is ready to accept electrons donated by the surface atoms of the iron or steel. The hydrogen is then shared between the surface atoms and the oxygen or nitrogen in the polymer.

Specific electrostatic site-bonding is another type of bonding which occurs when the polymer forms a salt-like attachment to specific sites on the solid surface of the equipment. In practice the number of functional groups forming such bonds is limited to carboxylates, phosphates, sulfonates and mercaptan derivatives.

The concentration of polymer needed for coating a metallic surface will vary with the molecular weight of the particular polymer used; however, good results can be obtained by initial concentrations as low as 0.3 to 10 p.p.m. With continual use the concentrations could be as low as 0.01 p.p.m. It is desirable to have a higher concentration of the polymer in solution with the initial pass through the system and it is desirable to have the polymer solution as the first fluid to pass through the system. With the higher concentrations on a first pass, the polymer has a better opportunity to coat the exposed metallic surfaces before any substantial corrosion occurs. However, if tubercles of corrosion have formed or sediment collects before the application of the polymer to the system, the solution will flocculate the sediment, remove the tubercles and then coat the cleaned metallic surface. It should be noted that the flocculation process is relatively slow and the initial coating process is much preferred.

In one-through systems and very large cooling towers, satisfactory results can be obtained by treating at the aforementioned concentrations for as little as fifteen minutes to half an hour per day following the first coating. Treatment for one hour a day is preferred for the first ninety days to remove existing tubercles if the initial pass coating is not applied. In smaller re-circulating systems, where the cost is not a major factor compared to the problems that are encountered with corrosion, these concentrations can be maintained continually. Experience and data accumulated to date also indicates that a daily treatment (or recoating process) for as little as fifteen minutes eliminates the tubercle formation problem.

One of the outstanding features of these polymers is that they are virtually chemically inert and will not adversely effect the action of other chemicals normally used in cooling water. Consequently, they can be added to systems that are already being treated with chemicals for scale formation, hardness and biological growth, without upsetting the chemical balance of the system, and of ten times actually enhancing the effectiveness of the other additives.

With this in mind it was thought that the combination of the polymer with other corrosion inhibitors of specialized application would be beneficial. Of all those tried the synergistic effect of the combination of polymer, water soluble silica containing compounds and/or water soluble chromium containing compounds was most remarkable.

The use of water soluble silica containing compounds is old in the water treatment art and customarily the concentration recommended is about 50 p.p.m. and up, depending upon the pH of the water and other factors.

The use of water soluble chromates or other hexavalent chromium containing compounds has been curtailed in recent years by pollution control regulations. Relatively high concentrations of hexavalent chromium compounds are recommended for maximum effectiveness, for example 200–2,000 p.p.m. Recently enacted law prevents the dumping of such concentrations of hexavalent chromium into streams.

It has been found that the effectiveness of a given polymer is dependent upon a number of considerations including the type and molecular weight of the polymer itself, the pH of the water, the severity of the existing tuberculation, and the concentration of electrolytes in the water. Where tuberculation is present in the advanced stages, less than 2 percent by weight of the polymer (based on the weight of the water) can be used and preferably less than 1 percent by weight may be used effectively. After the condition of severe tuberculation has been alleviated it is found that concentrations of polymer ranging from 0.01 to 300 parts of polymer per million parts of water is effective to maintain an effective coating and inhibit further corrosion, whether by sediment collection, tuberculation or other galvanic action. Clearly special situations can dictate different concentrations of the polymer but, usually the most effective range is approximately 0.3 to 10 parts per million parts of water for normal operations when used in combination with the aforementioned silica or chromium. Without the chromium or silica the recommended dosage of polyelectrolytic polymer is about 50–250 p.p.m.

This method is as effective against corrosion of systems comprising tanks which remain stagnant for periods of time as it is against corrosion in flowing systems. The coating is not removed by the flowing water because, in the thin film formed adjacent the metallic surfaces there is substantially no turbulence. Thus, the coating will serve as a protective barrier against oxygen entrained in the water. The polymer coating is slowly removed as it tends to flocculate sediment or corrosion products and must be replenished periodically.

If desired, stock solutions can be prepared by adding 1 to 20 percent by weight of the polymer to water at a temperature of about 90° F. This concentrated solution then can be metered into the water flowing into the system to obtain the required concentration. Alternatively, a dry form of the polymer can be added to the system. This can be done by simply adding the dry particles to the water as it is taken in at the main inlet from its source. The water coming from the main source then can be piped into one or more different cooling systems.

The water soluble silica and/or chromium compounds may also be added to the system in the same way as the polymer, either separately or as a mixture. In rare cases where the water is particularly acidic or basic a proper buffering additive will be included to hold the pH approximately in the range 6.0–10.0. Occasionally, an acid or base will be added to bring the water into this pH range.

The water soluble silica preferred is selected from the group consisting of silicates of sodium, lithium, potassium and ammonium and ortho and meta forms of silicic acids. Any source of water soluble silica would be useful and clearly alkali metal silicates are a convenient source of water soluble silica. Liquid or dry sodium silicates with a weight ratio of about 0.67 to 3.75 of $SiO_2/Na_2O$ are satisfactory, though the most commonly available source of silica is a dry crystalline sodium metasilicate $$(Na_2SiO_3 \cdot 5H_2O)$$

a 40° Baumé liquid sodium silicate having a weight ratio of $SiO_2/Na_2O$ of about 3.22. Preferably the silica will be present in concentrations of about 0.1 to 500 parts per million parts of water and most desirably 3 to 50 p.p.m.

The preferred hexavalent chromium compound is selected from the group consisting of alkali metal chromates and dichromates, ammonium chromate, chromic acid, their hydrated forms and mixtures thereof. The most desirable concentration of the chromium is about 0.3 to 10 p.p.m. but the concentration could be as low as 0.1 p.p.m. and as high as 500 p.p.m. and still be effective.

The above indicated silica and chromium concentrations are based upon use simultaneously with appropriate concentrations of polyelectrolytic organic polymer and sometimes with scale inhibiting polymers which will be further discussed subsequently. Where both silica and chromium are combined with the polyelectrolytic organic polymer, the concentrations for each should be maintained within the indicated limits but the total concentration of additives should be in the range of about 0.2 to 1,000 p.p.m. and most desirably in the range of about 3 to 100 p.p.m.

The following chart illustrates the more effective results obtained by combining water and the polyelectrolytic organic polymer with a chromium containing compound, a silica containing compound or a combination of silica and chromium containing compounds. The polymer used in the tests and case histories was polyacrylamide having an average molecular weight of about 3–5,000,000, the chromate used was sodium chromate, the silicate used was sodium silicate and the water had a pH of about 7.2–7.4.

| System evaluated in Cleveland Tap Water | After 6 days appearance of specimen (mild steel) |
|---|---|
| Chromate at 50 p.p.m. (as $CrO_4$). | Heavy iron oxide deposits, pitting pronounced. |
| Chromate at 25 p.p.m. (as $CrO_4$). | Specimen heavily coated with iron oxide and pitting severe. |
| Silicate at 50 p.p.m. (as $SiO_2$)___ | Iron oxide deposits and pitting quite pronounced. |
| Silicate at 25 p.p.m. (as $SiO_2$) __ | Heavily coated with iron oxide and pitting severe. |
| Polymer at 50 p.p.m. (as polymer). | Slight rust stain, no pitting. |
| Polymer at 5 p.p.m. (as polymer). | Iron oxide deposits, very soft, some pitting. |
| Polymer at 2 p.p.m. ( as polymer). | Heavy iron oxide deposits all loosely adhered, some pitting. |
| Polymer at 2 p.p.m.; Silicate at 25 p.p.m. (as $SiO_2$). | Specimen clean, no pitting. |
| Polymer at 2 p.p.m.; chromate at 25 p.p.m. (as $CrO_4$). | Some iron oxide deposits, very slight pitting. |
| Polymer at 2 p.p.m.; silicate at 25 p.p.m, chromate at 25 p.p.m. | Specimen clean no pitting. |

CASE HISTORY NO. 1—CHEMICAL PLANT COOLING TOWER

| | |
|---|---|
| Chromate 30 p.p.m./ phosphate 5 p.p.m./zinc 2 p.p.m. | Corrosion specimens were pitted slightly, some tuberculation; corrosion rates—3.5 m.p.y, [1] pit depth—30 m.p.y. |
| Polymer at 1 p.p.m; chromate at 10 p.p.m. and silicate at 8 p.p.m. | Corrosion specimens were devoid of pits and no tuberculation; corrosion rates—1.7 m.p.y., pit depth—none noted. |

| CASE HISTORY NO. 2 | |
|---|---|
| Chromate 25 p.p.m./ phosphate 10 p.p.m. | Corrosion specimen deposits of iron oxide, some pitting and tuberculation; corrosion rates—2.5 m.p.y., pit depth—40-60 mils. |
| Polymer at 0.75 p.p.m.; silicate at 10 p.p.m. | Corrosion specimen some slight iron oxide deposits, no tuberculation; corrosion rates—1.3 m.p.y., pit depth—1.5-1.7 m.p.y. |

| CASE HISTORY NO. 3 | |
|---|---|
| Polyphosphate 30 p.p.m./ ferrocyanide 10 p.p.m. | Heavy deposits of iron oxide, corrosion with pitting; corrosion rates—5-10 m.p.y., pitting very evident. |
| Polymer at 1 p.p.m; silicate at 15 p.p.m. | Some light deposits of iron oxide; corrosion rates—3-5 m.p.y., no pitting attack. |

| CASE HISTORY NO. 4 | |
|---|---|
| Organic zinc—75-100. | Heavy deposits of iron oxide; corrosion rates—8-12 m.p.y., severe pitting. |
| Polymer at 1 p.p.m.; silicate at at 15 p.p.m. | No deposits; corrosion rates—1-3 m.p.y., no pitting. |

| CASE HISTORY NO. 5 | |
|---|---|
| Chromate 10 p.p.m./zinc 10 p.p.m. | Some deposits of iron oxide; corrosion rates—3-5 m.p.y., moderate pitting. |
| Polymer 1 p.p.m./chromate 5 p.p.m.,/ silicate 3-5 p.p.m. | No deposits; corrosion rates—1-3 m.p.y. no pitting. |

[1] The abbreviation "m.p.y". means "milligrams per year."

The above case histories are actual test results taken in numerous different geographic locations within the United States and they clearly indicate the improved results of the method of this invention as opposed to traditional water treatment methods.

Using the corrosion rates from the mild steel coupons shown above, one can extrapolate and calculate expected results with copper and aluminum alloys. One way to do this is explained in the "Corrosion Handbook" by H. H. Ohlig, published by John R. Wiley & Sons, 1953, and certain correlation factors are given as necessary. No further comment appears necessary on this as the techniques of using correlation factors are well known in the art.

From the illustrative data shown above it is obvious that the combination of polymer with silica, hexavalent chromium or silica-chromium together will provide much better corrosion control than previously known water additives for ferrous, aluminum and copper alloys. Additionally, much smaller quantities of the combined materials are required to obtain the same results than is required when each is used alone. This is particularly important from the standpoint of pollution control laws. The much lower quantities of hexavalent chromium necessary can mean the difference between an effective, usable additive and one that is barred by law.

In addition to the improved corrosion control offered by this invention, the various components have been found to be compatible with certain scale control additives. Examples of such scale control additives are polyacrylic acid, polyacrylate, organic phosphonates and mixtures thereof. In combination with the corrosion control additives, the scale inhibiting polymers should have an average molecular weight of about 1,000 to 50,000 and should be mixed with the water in concentrations of about 0.5 to 20 parts per million parts of water. Many of these scale inhibiting polymers are known to those having ordinary skill in the art. However, such polymers are not known to be effective in the particular combination of this invention nor in the low concentrations indicated.

It is not known why these scale inhibiting polymers are so effective at the low concentrations but, it is speculated that the long chain, polyelectrolytic organic polymer may degrade in size over a period of time by reason of agitation, abrasion, etc. as it passes through the pumps and tubes. If this theory is correct, the actual concentration of low molecular weight polymer will increase with time, particularly in a closed system. However, tests indicate that the scale inhibiting polymers are effective at the initial concentrations listed and that subsequent developments do not impair their effectiveness.

We claim:
1. A method of removing tubercles of corrosion from a metallic substrate and inhibiting further corrosion comprising,
combining a polyelectrolytic organic polymer and a water soluble silica containing compound with water to form an aqueous solution and contacting the metallic substrate with said solution to remove any existing tubercles of corrosion and inhibit further corrosion of said substrate,
said polyelectrolytic organic polymer being prepared from compounds characterized by the formula:

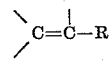

wherein R is selected from the group consisting of nitrile, imine, amide and carboxyl radicals,
said polymer having an average molecular weight ranging from about 15,000 to 15,000,000,
the weight concentration of said polymer being approximately in the range 0.01 to 300 parts per million parts of water.

2. The method of claim 1 wherein said silica is selected from the group consisting of:
alkali metal silicates, ammonium silicates, ortho and meta silicic acids, the hydrated forms thereof and mixtures thereof.

3. The method of claim 2 wherein the weight concentration of said silica being approximately in the range 0.1 to 500 parts per million of water.

4. The method of claim 1 with the weight concentration of said silica being approximately in the range 0.1 to 500 parts per million of water.

5. The method of claim 1 wherein said silica is a sodium silicate having a weight ratio of $SiO_2$ to $Na_2O$ approximately in the range 0.67 to 3.75.

6. The method of claim 5 with the weight concentration of said silica being approximately in the range 0.1 to 500 parts per million of water.

7. The method of claim 1 wherein said polymer is a copolymer.

8. The method of claim 1 wherein R is an amide radical.

9. The method of claim 1 wherein R is a carboxyl radical and is represented by the formula —COOM,
wherein M is selected from the group consisting of hydrogen, ammonium, metals and organic radicals.

10. The method of claim 1 including combining a second polymer with said water, said second polymer being selected from the group consisting of polyacrylic acid, polyacrylates, organic phosphonates, and mixtures thereof, and being different from the first selected polymer,
said second polymer having an average molecular weight ranging from about 1,000 to 50,000,
the weight concentration of said second polymer being approximately in the range 0.5 to 20 parts per million parts of water.

11. A method of removing tubercles of corrosion from a metallic substrate and inhibiting further corrosion comprising,
combining a polyelectrolytic organic polymer and a water soluble hexavalent chromium containing compound with water to form an aqueous solution and contacting the metallic substrate with said solution to remove any existing tubercles of corrosion and inhibit further corrosion of said substrate,
said polymer being prepared from compounds characterized by the formula:

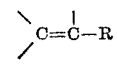

wherein R is selected from the group consisting of nitrile, imine, amide and carboxyl radicals,
said polymer having an average molecular weight ranging from about 15,000 to 15,000,000,
the weight concentration of said polymer being approximately in the range 0.01 to 300 parts per million parts of water.

12. The method of claim 11 including combining a second polymer with said water, said second polymer being selected from the group consisting of polyacrylic acid, polyacrylates, organic phosphonates, and mixtures thereof, and being different from the first selected polymer,
said second polymer having an average molecular weight ranging from about 1,000 to 50,000,
the weight concentration of said second polymer being approximately in the range 0.5 to 20 parts per million parts of water.

13. The method of claim 11 wherein said polymer is a copolymer.

14. The method of claim 11 wherein R is an amide radical.

15. The method of claim 11 wherein R is a carboxyl radical and is represented by the formula —COOM,
wherein M is selected from the group consisting of hydrogen, ammonium, metals and organic radicals.

16. The method of claim 11 wherein said chromium containing compound is selected from the group consisting of alkali metal chromates and dichromates, ammonium chromate, chromic acid, their hydrated forms and mixtures thereof.

17. A method of removing tubercles of corrosion from a metallic substrate and inhibiting further corrosion comprising,
combining two polymers with water to form an aqueous solution and contacting the metallic substrate with said solution to remove any existing tubercles of corrosion and inhibit further corrosion of said substrate,
the first polymer being an electrolytic organic polymer and being prepared from compounds characterized by the formula:

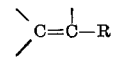

wherein R is selected from the group consisting of nitrile, imine, amide and carboxyl radicals,
said first polymer having an average molecular weight ranging from about 15,000 to 15,000,000,
the weight concentration of said first polymer being approximately in the range of 0.01 to 300 parts per million parts of water,
the second polymer being different from said first polymer and being selected from the group consisting of polyacrylic acid, polyacrylates, organic phosphonates, and mixtures thereof,
said second polymer having an average molecular weight ranging from about 1,000 to 50,000,
the weight concentration of said second polymer being approximately in the range of 0.5 to 20 parts per million parts of water.

18. The method of claim 17 wherein said first polymer is a copolymer.

19. The method of claim 17 wherein R is an amide radical.

20. The method of claim 17 wherein R is a carboxyl radical and is represented by the formula —COOM,
wherein M is selected from the group consisting of hydrogen, ammonuim, metals and organic radicals.

21. A method of removing tubercles of corrosion from a metallic substrate and inhibiting further corrosion comprising,
combining a polyelectrolytic organic polymer, a water soluble silica containing compound and a water soluble hexavalent chromium compound with water to form an aqueous solution and contacting the metallic substrate with said solution to remove any existing tubercles of corrosion and inhibit further corrosion of said substrate,
said polymer being prepared from compounds characterized by the formula:

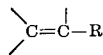

wherein R is selected from the group consisting of nitrile, imine, amide and carboxyl radicals,
said polymer having an average molecular weight ranging from about 15,000 to 15,000,000,
the weight concentration of said polymer being approximately in the range 0.01 to 300 parts per million parts of water.

22. The method of claim 21 wherein said silica is selected from the group consisting of:
alkali metal silicates, ammonium silicate, ortho and meta silicic acids, the hydrated forms thereof and mixtures thereof.

23. The method of claim 22 with the weight concentration of said silica being approximately in the range 0.1 to 500 parts per million of water.

24. The method of claim 23 wherein said chromium containing compound is selected from the group consisting of alkali metal chromates and dichromates, ammonium chromate, chromic acid, their hydrated forms and mixtures thereof.

25. The method of claim 22 wherein said chromium containing compound is selected from the group consisting of alkali metal chromates and dichromates, ammonium chromate, chromic acid, their hydrated forms and mixtures thereof.

26. The method of claim 21 with the weight concentration of said silica being approximately in the range 0.1 to 500 parts per million of water.

27. The method of claim 26 wherein said chromium containing compound is selected from the group consisting of alkali metal chromates and dichromates, ammonium chromate, chromic acid, their hydrated forms and mixtures thereof.

28. The method of claim 21 wherein said silica is a sodium silicate having a weight ratio of $SiO_2$ to $Na_2O$ approximately in the range 0.67 to 3.75.

29. The method of claim 28 wherein said chromium containing compound is selected from the group consisting of alkali metal chromates and dichromates, ammonium chromate, chromic acid, their hydrated forms and mixtures thereof.

30. The method of claim 28 with the weight concentration of said silica being approximately in the range 0.1 to 500 parts per million of water.

31. The method of claim 30 wherein said chromium containing compound is selected from the group consisting of alkali metal chromates and dichromates, ammonium chromate, chromic acid, their hydrated forms and mixtures thereof.

32. The method of claim 21 wherein said polymer is a copolymer.

33. The method of claim 21 wherein R is an amide radical.

34. The method of claim 21 wherein R is a carboxyl radical and is represented by the formula —COOM,
wherein M is selected from the group consisting of hydrogen, ammonium, metals and organic radicals.

35. The method of claim 21 including combining a second polymer with said water, said second polymer being selected from the group consisting of polyacrylic acid, polyacrylates, organic phosphonates, and mixtures thereof, and being different from the first selected polymer,
said second polymer having an average molecular weight ranging from about 1,000 to 50,000,
the weight concentration of said second polymer being approximately in the range of 0.5 to 20 parts per million parts of water.

36. The method of claim 35 wherein said first polymer is a copolymer.

37. The method of claim 35 wherein R is an amide radical.

38. The method of claim 35 wherein R is a carboxyl radical and is represented by the formula —COOM,
wherein M is selected from the group consisting of hydrogen, ammonium, metals and organic radicals.

39. The method of claim 35 wherein said silica is selected from the group consisting of:
alkali metal silicates, ammonium silicate, ortho and meta silicic acids, the hydrated forms of the same and mixtures thereof.

40. The method of claim 39 with the weight concentration of said silica being approximately in the range 0.1 to 500 parts per million of water.

41. The method of claim 35 with the weight concentration of said silica being approximately in the range 0.1 to 500 parts per million of water.

42. The method of claim 35 wherein said silica is a sodium silicate having a weight ratio of $SiO_2$ to $Na_2O$ approximately in the range 0.67 to 3.75.

43. The method of claim 42 with the weight concentration of said silica being approximately in the range 0.1 to 500 parts per million of water.

44. The method of claim 35 wherein said chromium containing compound is selected from the group consisting of alkali metal chromates and dichromates, ammonium chromate, chromic acid, their hydrated forms and mixtures thereof.

45. The method of claim 21 wherein said chromium containing compound is selected from the group consisting of alkali metal chromates and dichromates, ammonium chromate, chromic acid, their hydrated forms and mixtures thereof.

References Cited
UNITED STATES PATENTS

| | | | |
|---|---|---|---|
| 3,085,916 | 4/1963 | Zimmie | 134—22 |
| 2,994,664 | 8/1961 | Wachter | 252—146 X |
| 3,293,152 | 12/1966 | Herbert | 252—180 X |
| 2,980,610 | 4/1961 | Ruehrwein | 210—58 |
| 3,331,773 | 7/1967 | Gunderson | 210—58 |
| 3,382,081 | 5/1968 | Cutter | 106—14 |
| 3,487,018 | 12/1969 | Troscinski | 252—389 X |
| 3,514,376 | 5/1970 | Salutsky | 252—180 X |

JOHN T. GOOLKASIAN, Primary Examiner

M. E. McCAMISH, Assistant Examiner

U.S. Cl. X.R.

21—2.7; 134—2, 22; 210—58; 252—82, 181, 389